United States Patent [19]

Leatherman

[11] Patent Number: 5,279,037
[45] Date of Patent: Jan. 18, 1994

[54] GUIDE FOR A PORTABLE SAW

[75] Inventor: Alfred R. Leatherman, Yadkinville, N.C.

[73] Assignee: Locksley S. Hall, Yadkinville, N.C.

[21] Appl. No.: 886

[22] Filed: Jan. 4, 1993

[51] Int. Cl.⁵ .......................................... B27B 11/02
[52] U.S. Cl. ................................................... 30/373
[58] Field of Search ...................... 83/821; 30/371, 373

[56] References Cited

U.S. PATENT DOCUMENTS

| 2,377,673 | 6/1945 | Chaddock | 30/373 |
|---|---|---|---|
| 2,819,742 | 1/1958 | Blachly | 30/373 |
| 2,916,062 | 12/1959 | Clawson | 30/373 |
| 3,456,698 | 7/1969 | Csaki | 30/373 |
| 4,051,597 | 10/1977 | Cardoza | 30/373 |

FOREIGN PATENT DOCUMENTS

| 171748 | 6/1952 | Fed. Rep. of Germany | 30/373 |
|---|---|---|---|
| 56-82119 | 7/1981 | Japan | 30/373 |

Primary Examiner—Scott Smith

[57] ABSTRACT

A guide for a portable saw having a work surface engaging plate which is formed primarily of a base and pin affixed to the work surface engaging plate, the pin being in line with the blade and engaging the kerf made by the blade to cause the blade to produce a straight cut in the work surface and spread the work surface apart and away from the blade.

1 Claim, 1 Drawing Sheet

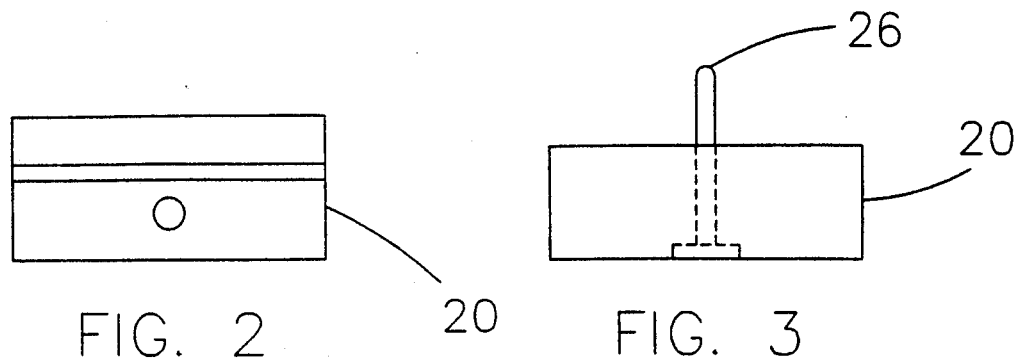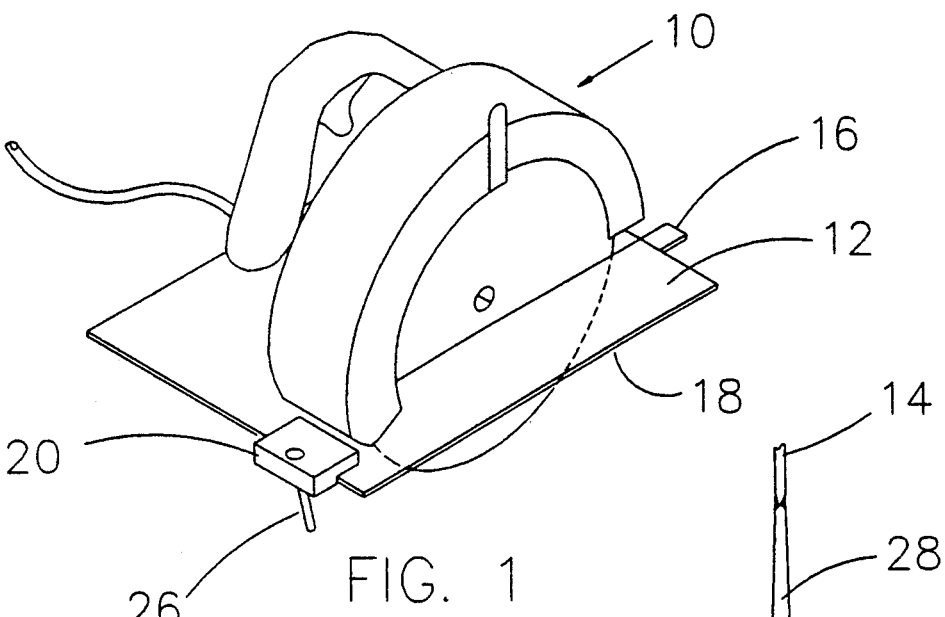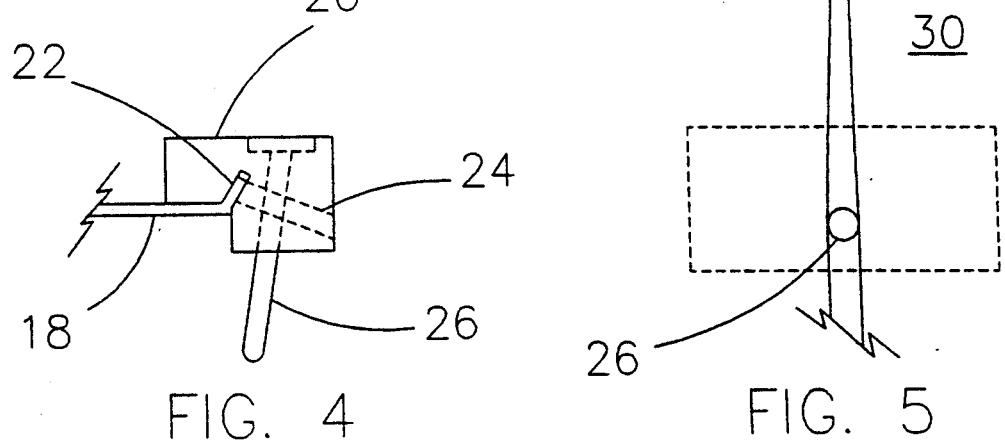

GUIDE FOR A PORTABLE SAW

BACKGROUND OF THE INVENTION

1. Field of the Invention

The present invention relates to portable saw accessories and more particularly to a guide for a portable saw to produce straight cuts in work surfaces and prevent the blade from binding.

2. Description of the Prior Art

Numerous devices and accessories for saws have been developed to achieve straight and efficient cuts. Examples of such are disclosed in U.S. Pat. Nos. 3,656,519; 3,674,065 and 4,920,845. These devices are primarily used on relatively large permanent saws and primarily function to stabilize blade vibration, prevent kickback or permit effecient introduction of the work piece against the saw blade. Those that relate to smaller portable saws are generally of the nature of the disclosure shown in U.S. Pat. No. 4,920,845 for a miter box wherein the saw is introduced to an apparatus that will guide it along a desired cutting line. Other traditional techniques involve the releasable securement of a straight edge to the surface in which a cut is to be made so that the portable saw can be urged against the edge and moved forward to perform the cut. This of course requires time consuming attachment and release of the guide to be certain that it is in perfect alignment with the cutting position. Few devices are known that will enable the free hand cutting of a straight line in a work piece, and it is to this need that the present invention is directed.

SUMMARY OF THE INVENTION

It is therefore the principal object of the present invention to provide a new and improved guide for a portable saw that will enable the free-hand straight line cutting of a work piece that has all of the advantages of prior art devices and none of the disadvantages.

A further object of the present invention is to provide a guide for a portable saw that is simple in construction and that can be adapted for use on existing portable saws or incorporated in new manufacturing procedures for such tools.

It is a further object of the present invention to provide a new and improved guide for a portable saw that may be interchanged with other guides to accommodate blades of varying thickness.

Yet still another object of the present invention is to provide a new and improved guide for a portable saw which is easy and convenient to install, adjust and disassemble while providing operational advantages heretofore unachieved.

The present invention includes a base in the form of a releasably securable member that can be affixed to the work surface engaging plate and a pin which is affixed to and depends from that base and extends into the kerf formed by the saw blade as it cuts. It is acceptable to affix a pin directly to the undersurface of the work surface engaging plate provided the pin has its own small base for direct securement to the plate. A convenient way to affix a base to the plate is by notching it to encompass the lip formed at the back edge of the plate and securing it thereto with set screws.

Thus, there has been outlined the more important features of the invention in order that the detailed description that follows be better understood and in order that the present contribution to the art be better appreciated. There are, of course, additional features of the invention that will be described hereinafter and which will form the subject matter off the claims appended hereto. Before explaining one embodiment of the invention in detail, it is to be understood that the invention is not limited in its application to the details of the construction and to the arrangement of the components set forth in the following description and drawings. The invention is capable of other embodiments and of being practiced and carried out in various ways. Also it is to be understood that the phraseology and terminology employed herein are for the purpose of description and should not be regarded as limiting. As such, those skilled in the art will appreciate the conception upon which this disclosure is based, and that it may readily be utilized as a basis for designing other structures, methods and systems for carrying out the several purposes of the invention. It is important, therefore, that the claims be regarded as including such equivalent constructions insofar as they do not depart from the spirit and scope of the present invention.

These, together with other objects of the invention, along with the various features of novelty which characterize the invention, are pointed out with particularity in the detailed description that follows accompanied by the drawings wherein like characters of reference designate like parts throughout the several views.

BRIEF DESCRIPTION OF THE DRAWINGS

FIG. 1 is a perspective view of a portable saw carrying the guide forming the present inventive concept;

FIG. 2 is a side elevational view of the guide for a portable saw showing the pin position with respect to the to which it is secured;

FIG. 3 is a front elevational view of the guide shown in FIG. 2; and

FIG. 4 is a side elevational, partial and sectional view of the guide forming the present invention affixed to the upturned lip of a work surface engaging plate of a portable saw.

FIG. 5 is a top view of the pin positioned within the kerf.

DETAILED DESCRIPTION OF THE INVENTION

Referring now to the drawings and particularly to FIG. 1, a portable saw shown generally as 10 is equipped with a work surface engaging plate 12 that fits flatly against a work surface to be sawed by blade 14. In a conventional saw of this nature, blade 14 will cut in a straight line if the operator is well trained or skilled in using the instrument. This is accomplished by having the operator line up the guide 16 with the line marking the cut to be made and relying on the operator to hold the guide evenly against the line until the cut has been completed.

Some times a securable guide is used so that the edge 18 of plate 12 can be forced against the guide and hold the saw along a very straight line as it is moved forward to cut the work piece. Most saws of this nature have an extendable side guide, slidable out to the right and perpendicular to the plain of the blade to engage the work surface along its outer edge and thereby hold the saw on an even cut. Even in these situations, it is difficult and time consuming to attempt to saw in this fashion.

The guide forming the present invention includes a base 20 having a slot 21 by which it is releasably secured to the lip 22 of plate 18 (FIG. 4) for example by set screws 24. A pin 26 extends downwardly through base 20 preferably at a slight forward incline as best shown in FIG. 4. Pin 26 held by base 20 is positioned directly in line with blade 14 so that it moves into the kerf 28 formed when the blade 14 cuts the work piece 30. It is essential that pin 26 be perfectly in line with blade 14 to lock the saw in a perfectly straight sawing position. Some "play" can be tolerated and still maintain the integrity of the straight cut, however, that play is likely to occur as a result of the difference between the size of the pin 26 and the thickness of blade 14. As shown in FIG. 4, pin 26 freely extends through an aperture in base 20. The slight forward inclined position maintains pin 26 in an operable condition. Pins of varying diameters may be positioned in the base aperture depending upon the thickness of the blade being used.

Obviously any form of pin extending from plate 12 will be effective to achieve the desired straight cut result whether it be affixed as in the embodiment described herein or welded or otherwise integrally formed with the work surface engaging plate during the manufacturing process.

Startling results are achievable by the use of the present invention to the extent that long narrow boards that have been warped can be effectively salvaged to some extent by merely sawing down each side to straighten the boards without the need of applying fixed guides or running the boards through plaining and shaping equipment. Obviously significant time is saved by having only to measure at one edge of a sheet of material to be sawn rather than measuring at both edges and drawing connecting lines to follow with guide 16 of the saw.

Pin 26 also functions as a spreader (see FIG. 5) forcing the work surface apart and away from the saw blade 14 to prevent binding and the like. It has been found desirable to have the pin 26 exceed the width of blade 14 by two to four times, the most desirable ratio being in the order of three to one.

The guide forming the present invention is helpful in making it known when the set in the saw blade is gone. Though the saw will not cut in that condition, the blade will be protected and will not bind because the guide keeps the wood from pressing against the blade.

The present invention is particularly helpful in cutting straight lines on rounded and square pieces of material such as barrels or wooden boxes. It is safe so that the user can focus on the saw and work piece instead of trying to follow lines drawn on the material to be cut.

The present invention also provides an excellent anti-kickback device because the material can never touch the saw blade unless the set in the blade is completely gone. The guide is larger than the blade and somewhat smaller than the saw cut. Thus no binding and kickback can occur.

With respect to the above description, it is to be realized that the optimum dimensional relationship for the parts of the invention including variations in size, materials, shape, form, function and manner of operation, assembly and use are deemed readily apparent and obvious to those skilled in the art, and all equivalent relationships to those illustrated in the drawings and described in the specification are intended to be encompassed herein. Therefore, the foregoing is consider as illustrative only of the principals of the invention. Further, since numerous modifications and changes will readily occur to those skilled in the art, it is not desired to limit the invention to the exact construction and operation shown and described. All suitable modifications and equivalents that fall within the scope of the appended claims are deemed within the present inventive concept.

What is claimed is:

1. In a portable saw having a work surface engaging plate with a forward and rearward lip and an opening through which a saw blade of predetermined thickness extends to cut the work surface and form a kerf, the improvement comprising: a cutting guide having a base and a pin having a preselected diameter held by and extending from the base, the base releasably secured to the plate rearward of the saw blade, retaining means releasably securing the base to the plate, the pin has a thickness of from two to four times the thickness of the blade, the pin aligned with the blade so that the pin engages the kerf made by the blade during cutting and causes the saw blade to make a straight cut in a work surface and spread the cut work surface apart and away from the saw blade, the base having a slot for receiving the plate rearward lip and an aperture for receiving the pin.

* * * * *